(12) United States Patent
Plath et al.

(10) Patent No.: US 8,682,543 B2
(45) Date of Patent: Mar. 25, 2014

(54) TRANSMISSION CONTROL METHOD

(75) Inventors: Detlef Plath, Tettnang (DE);
Friedemann Jauch, Tettnang (DE);
Franz-Josef Schuler, Kressbronn (DE);
Peter Spoerl, Ravensburg (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 141 days.

(21) Appl. No.: 13/098,564

(22) Filed: May 2, 2011

(65) Prior Publication Data
US 2011/0320094 A1 Dec. 29, 2011

(30) Foreign Application Priority Data
Jun. 24, 2010 (DE) .......................... 10 2010 030 495

(51) Int. Cl.
*F16H 61/16* (2006.01)

(52) U.S. Cl.
USPC .................... 701/51; 701/52; 701/53; 477/34; 477/115; 477/132; 477/144

(58) Field of Classification Search
USPC ........ 701/51–53; 447/34, 132, 135, 139, 140, 447/144
See application file for complete search history.

(56) References Cited

U.S. PATENT DOCUMENTS

| | | | |
|---|---|---|---|
| 6,002,976 A | 12/1999 | Hollstein et al. | |
| 6,514,174 B2 * | 2/2003 | Iida et al. | 477/125 |
| 7,396,317 B2 * | 7/2008 | Steen et al. | 477/115 |
| 7,921,945 B2 * | 4/2011 | Harris | 180/65.285 |
| 2008/0305927 A1 * | 12/2008 | Gierling et al. | 477/97 |
| 2009/0171539 A1 | 7/2009 | Sugiura et al. | |
| 2009/0171540 A1 | 7/2009 | Sugiura et al. | |
| 2009/0171542 A1 | 7/2009 | Sugiura et al. | |
| 2010/0004094 A1 * | 1/2010 | Shiiba et al. | 477/120 |

FOREIGN PATENT DOCUMENTS

| | | |
|---|---|---|
| DE | 197 47 262 A1 | 5/1999 |
| DE | 199 24 864 C1 | 1/2001 |
| DE | 10 2005 008 383 A1 | 9/2005 |
| DE | 10 2008 040 299 A1 | 1/2009 |

* cited by examiner

*Primary Examiner* — Helal A Algahaim
*Assistant Examiner* — Charles J Han
(74) *Attorney, Agent, or Firm* — Davis & Bujold, PLLC; Michael J. Bujold

(57) ABSTRACT

A method of operating a transmission having a plurality of gears which can operate in an automatic shifting mode, during which a gear is selected automatically depending on the current driving situation, and also in a manual shifting mode during which a gear is selected depending on a driver's command. When the driver commands a shift, a change takes place from the automatic shifting mode to the manual shifting mode. A specific threshold value of the transmission output speed or an equivalent rotational speed value is associated with each gear and, when the driver commands a downshift, a target gear is determined as a function of the current transmission output speed or the equivalent rotational speed value. The gear selected as the target gear is the gear whose specific threshold value is higher than or equal to the current transmission output speed or the equivalent rotational speed value.

6 Claims, 2 Drawing Sheets

| [%] | "1" | "2" | "3" | "4" |
|---|---|---|---|---|
| 6 | 850 | 1200 | 1700 | 2000 |
| 2 | 400 | 800 | 1200 | 1600 |
| -2 | 400 | 800 | 1200 | 1600 |
| -6 | 950 | 1300 | 1850 | 2200 |

Fig. 2

TRANSMISSION CONTROL METHOD

This application claims priority from German patent application Ser. No. 10 2010 030 495.6 filed Jun. 24, 2010.

FIELD OF THE INVENTION

The invention concerns a method for operating a transmission device with a plurality of gear ratios.

BACKGROUND OF THE INVENTION

Vehicles known from common practice are, in each case, designed with at least one transmission system between a drive input arrangement and a drive output, in order to obtain various operating ranges such as forward drive, reverse drive, and thrust operation or traction operation. The drive torque provided by the drive input arrangement is directed to the front axle in front-wheel-drive vehicles, to the rear axle in rear-wheel-drive-drive vehicles, and in all-wheel-drive vehicles to two or more driven vehicles axles with various degrees of distribution.

In these vehicles the transmission systems are in each case designed with a main transmission with which various gear ratios can be produced. Such main transmissions are in the form of gearshift transmissions, variable-speed automatic transmissions or even infinitely-variable automatic transmissions, which can be operated both in an automatic shifting mode and in a manual shifting mode. During the automatic shifting mode, a gear ratio is selected automatically depending on the current driving condition of the vehicle. During the manual shifting mode, a gear ratio can be selected on the basis of a desire indicated by the driver.

A change between the automatic shifting mode and the manual shifting mode can be commanded by a driver by means of a shift lever or a switch, for example one arranged in the area of a steering wheel, whereby actuation of the shift lever or switch can in addition also trigger a demand for a gear ratio change starting from an actual gear ratio currently engaged in the main transmission toward a target gear ratio. In this, an upshift or a downshift is commanded by virtue of a so-termed tip-minus or a tip-plus function.

After transitioning to the manual shifting mode or to a so-termed short-term manual mode, time monitoring is commenced and it is checked whether, within a defined time period, further shift commands have been issued by the driver. If this is not the case, then provided that various boundary conditions are fulfilled, preferably after the predefined time period has lapsed, the system automatically changes back again to the automatic shifting mode.

If there is a command by the driver for a downshift, for example because of a current driving situation to increase a currently available traction force provision or to increase a thrust torque of a engine in the form of an internal combustion engine in the area of a drive output, and if the downshift command is carried out by the so-termed tip-minus function at the same time as a change from the automatic shifting mode to the manual shifting mode, then in the known procedures, starting from the actual gear ratio a simple downshift to the next-lower gear ratio is authorized by the tip-minus function or, in the case of infinitely-variable transmissions, the gear ratio value currently set is adjusted continuously in the direction of a larger gear ratio.

At present variable-speed automatic transmissions are increasingly being produced with a larger number of gear ratio steps, with correspondingly smaller step intervals. Some gear ratios are so-termed overdrive gears by means of which vehicles can be operated over large operating ranges with low engine running speeds. In such cases vehicles with internal combustion engines, designed in the area of their drivetrains with decoupling means such as turbine torsion dampers, can be operated with very low engine running speeds.

With vehicle concepts of that type, a gear ratio change that is triggered by the tip-minus function sometimes does not produce the increase of traction force or thrust torque in the area of the drive output that is expected by the driver by virtue of his shift command, or there is no significant change of the torque applied at the drive output.

Starting from the above-described operating points of a drivetrain of a vehicle characterized by low running speeds of the engine, to produce a significant increase of the traction force or thrust torque it is necessary for the driver to command several consecutive downshifts, which in certain driving situations, such as when initiating a spontaneous overtaking process, cannot be carried out as spontaneously as necessary.

To assist the driver, shift levers or switches have been functionally improved to the effect that by actuating the shift lever or switch continuously over a longer period in the range of the tip-minus function, as the operating time increases further consecutive downshifts are triggered. However, the operating time within which a sometimes desired or expected torque at the drive output is made available for a driver, is made only very slightly shorter thereby.

When a downshift in a transmission system is commanded by the driver, then according to U.S. 2009/0171539 A1 a target gear ratio should be selected from a limited range of gear ratios compared with the total number of gear ratios available in the transmission system, in order to produce an increase of the torque applied at a drive output within acceptable operating times. The result of this is that when the driver commands a downshift starting from a gear ratio step currently engaged in the transmission, sometimes a multiple downshift is carried out. It is proposed, for example that in a transmission having eight gear ratio steps, starting with the eighth gear step currently engaged but also starting with the seventh gear step currently engaged, in both cases a driver's downshift command brings about a downshift to the sixth gear ratio step. This means that a driver's downshift command issued when the eighth gear is engaged triggers a downshift through two gear ratio steps, whereas if the driver's downshift command is issued when the seventh gear is engaged, a downshift by only one gear step takes place.

Disadvantageously, when selecting the gear ratio step to be engaged in the transmission system when the driver issues a downshift command, the current operating condition of the transmission system is not taken into account, and for that reason, during unfavorable operating condition variations of a vehicle drivetrain made with the transmission system concerned, the downshift does not result in the torque change in the area of the drive output that the driver expects.

To produce a change of the drive output traction force, called for by a driver's downshift command, with the spontaneity expected by the driver, according to the procedure described in U.S. 2009/0171540 A1 after the driver has commanded a downshift, a gear ratio step is selected, which differs by a minimum gear ratio from the currently engaged gear ratio step. Depending on the layout of the gear ratios of a transmission system and the choice of the gear ratio change for a downshift, a driver's downshift command starting from the current gear ratio step can in some cases result in a multiple downshift.

In this procedure too, when a downshift is commanded the existing operating status of the transmission is disadvantageously not considered in the selection of the target gear to be engaged.

Furthermore, from U.S. 2009/0171542 A1 it is known, when the driver commands a downshift, to select from the total number of gear-ratios available in a transmission system, a limited range of gears depending on the driving speed, the road inclination or a steering angle, from which the target gear to be engaged on the basis of the driver's downshift command can be selected.

During driving operation of a vehicle, when there is a downshift command and for example the currently engaged gear ratio step is the fourth gear or the currently engaged gear ratio step is the fifth gear at the same vehicle speed, a double downshift to the second, or to the third gear ratio step, respectively, will be carried out regardless of the current operating status.

Accordingly, the driving behavior of a vehicle characterized by the torque applied in the drive output area after the gear ratio change concerned cannot be anticipated by the driver.

SUMMARY OF THE INVENTION

The purpose of the present invention is to make available a method for operating a transmission device with a plurality of gear ratios, by means of which a driver's downshift command brings about an increase of the torque applied at the drive output of a vehicle with sufficiently great spontaneity.

During the method according to the invention for operating a transmission device with a plurality of gear ratios, both in an automatic shifting mode during which a gear ratio is selected automatically on the basis of a current driving condition of a vehicle, and also in a manual shifting mode during which a gear ratio is selected as a function of a driver's wish indication, when a shift command is issued by the driver a change takes place from the automatic shifting mode to the manual shifting mode.

According to the invention, with each gear ratio there is associated a threshold value, specific to that gear ratio, of the transmission output speed or a rotational speed value equivalent thereto. When the driver commands a downshift, a target gear ratio to be engaged in the transmission is determined as a function of the current transmission output speed or speed value equivalent thereto, and that gear ratio is selected as the target gear whose gear-ratio-specific threshold value is larger than or equal to the current transmission output speed or the speed value equivalent thereto.

In the method according to the invention the target gear ratio, adapted to the current operating status, is selected as a function of the current transmission output speed or a speed value equivalent thereto, which in turn are proportional to a vehicle speed. Accordingly, when on the basis of a downshift command there is a change from the automatic shifting mode to the manual shifting mode at the same vehicle speed, regardless of the current actual gear ratio in all cases the same target gear is made available to the driver, so that the respective torque applied at the drive output and the respective target gear selected correspond to the driver's wish and the resulting driving behavior of a vehicle can easily be anticipated by the driver and provides the driver with an expected increase of the traction force or thrust torque in the drive output area. Thus, with any transmission output speed or rotational speed value equivalent thereto that exists when a downshift is commanded, there is associated a specific gear ratio which, when the driver commands a downshift, can be determined in a simple manner as a function of the current operating condition of the vehicle.

In the case of a transmission system with discrete gear ratio steps, by virtue of the procedure according to the invention, when a driver commands a downshift in each case the target gear that corresponds to the current operating condition is selected, and in a gear change starting from a current actual gear ratio toward the selected target gear ratio, depending on the operating condition either no, or one, or more than one gear ratio step is jumped. In this way a torque applied at the drive output can be correspondingly increased with a high level of spontaneity as expected by the driver and preferably in a manner adapted to the driving situation at the time.

A change command from the automatic shifting mode to the manual shifting mode or to a shifting mode comparable thereto can be initiated by the driver by actuating a switch, in particular one provided in the area of a steering wheel and having a so-termed tip-minus function. Alternatively, a driver's downshift command can also be triggered by the driver by moving a shift lever to a position for the manual shifting mode and actuating a corresponding tip-minus function within a subsequent, defined time interval.

The method according to the invention can be used advantageously for all transmission devices that can be operated automatically, i.e. in particular dual-clutch transmissions, automatic torque-converters or semi-automatic manual shift transmissions. Besides stepped variable-speed automatic transmissions, the method according to the invention is also suitable for the operation of infinitely-variable transmission devices.

An operating-condition-dependent selection of the target gear to be engaged as a function of the transmission output speed can be effected with little complexity, since the current transmission output speed existing when the driver commands a shift can be determined by simple measurement means such as a sensor that is provided in the transmission device. Alternatively, for the operating-condition-dependent selection of the target gear, a drive output speed that can be determined by measurement in the area of the wheels can also be used, this being a rotational speed value equivalent to the transmission output speed.

Since, due to a downshift command when the operating condition is varying, a driver sometimes expects differing changes of the torque applied at the drive output, in an advantageous variant of a method according to the invention the target gear, determined as a function of a driver's shift command, is selected as a function of at least one further influencing parameter, such as a current driving resistance, preferably a road gradient and an air resistance, an accelerator pedal position, an accelerator pedal gradient and/or a longitudinal acceleration of the vehicle.

The gear-ratio-specific threshold value of the transmission output speed or rotational speed value equivalent thereto can be in a functional relationship with the influencing parameter, so that if the influencing parameter changes then the threshold value of the transmission output speed or speed value equivalent thereto associated with the gear ratio concerned varies, and the target gear selection is influenced by a current value of the parameter.

The target gear to be engaged can be determined simply if the threshold values associated with the gear ratios are stored as a characteristic performance matrix, so that the procedure according to the invention can be easily implemented in existing control units, such as an electronic transmission control unit.

To determine a target gear as closely as possible adapted to the current operating status of a vehicle, in an advantageous variant of the method according to the invention, when an operating condition of the vehicle exists which is characterized by at least one current value of an influencing parameter which lies between the values of the parameter stored in the characteristic performance matrix, the threshold value upon which the selection of the target gear is based is determined by interpolation. This interpolation is carried out between the gear-ratio-specific threshold values of the transmission output speed or the speed equivalent thereto with which those influencing parameters are associated, between which the current value of the influencing parameter is located. Thus, when the driver commands a downshift, the target gear is determined with reference to the gear-ratio-specific threshold values of the transmission output speed or speed value equivalent thereto, which are available at least temporarily, are adapted to the current operating status, and can be determined in a simple manner without the need for additional storage capacities.

In order to be able to vary in an operating-status-dependent manner, the above-described influence of various influencing parameters on the threshold values stored in the characteristic performance matrix and associated with the transmission output speeds or speed values equivalent thereto, in a further advantageous variant of the method according to the invention it is provided that, as a function of a currently existing value of an influencing parameter, a selection of the target gear takes place or does not take place, depending on the characteristic performance matrix.

In a further variant of the method, when there is a target gear which has been determined as a function of a driver's downshift command and which is higher than, or the same as the actual gear currently engaged in the transmission device, a single downshift starting from the actual gear ratio is commanded. When a target gear has been determined as a function of a driver's downshift command, which is lower than the actual gear currently engaged in the transmission, the target gear is commanded. This ensures that when a downshift is commanded, at least a single downshift takes place and thus the traction torque or thrust torque applied at the drive output is increased.

To prevent damage to the transmission device, the engine and/or other assemblies of the vehicle drivetrain, in a further advantageous variant of the method according to the invention, in each case the selected target gear is engaged in the transmission if a transmission input speed corresponding to the target gear is lower than or equal to a maximum allowable transmission input speed. Besides the transmission input speed, to prevent damaging the transmission or the engine it is additionally possible to monitor a transmission output speed that corresponds to the target gear, or the running speed of the engine.

Both the characteristics specified in the claims and the features of the method according to the invention indicated in the example embodiment described below are in each case suitable, in their own right or in any combination with one another, to develop further the object according to the invention. As regards the further development of the object according to the invention, the combinations of features do not represent any limitation, but rather, are described essentially only as examples.

BRIEF DESCRIPTION OF THE DRAWINGS

Other advantages and advantageous embodiments of the method according to the invention emerge from the claims and from the example embodiment whose principle is described with reference to the drawing, which shows:

FIG. 2: Characteristic performance matrix which is used to determine the target gear to be engaged in the transmission device of FIG. 1, when a change takes place from an automatic shifting mode to a manual shifting mode or a shifting mode equivalent thereto.

DETAILED DESCRIPTION OF THE PREFERRED EMBODIMENTS

Figure 1:
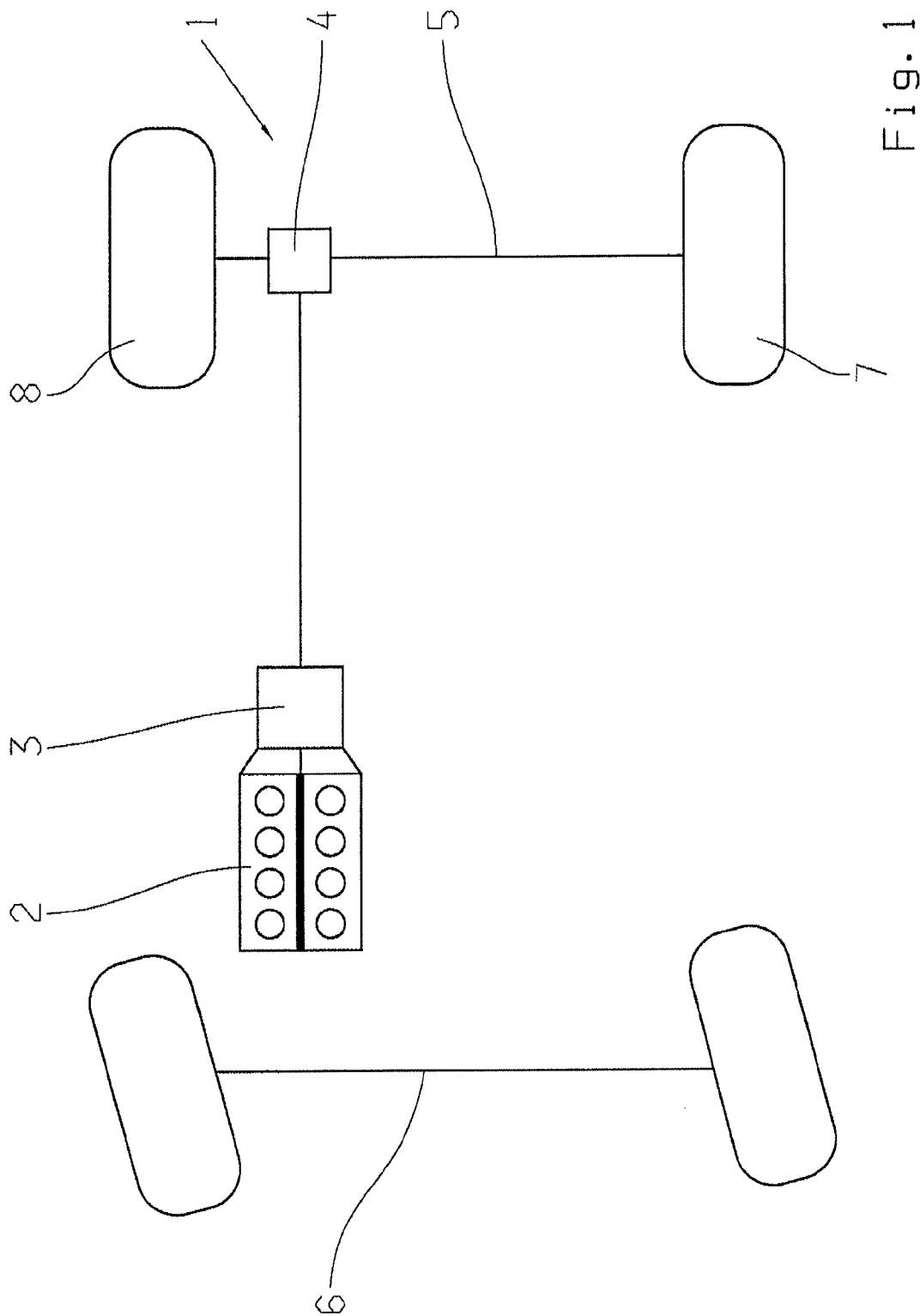
FIG. 1: Simplified representation of a drivetrain of a motor vehicle with an engine and a transmission device.

FIG. 1 represents a drivetrain 1 of a vehicle with an engine 2, a transmission device 3 by means of which various gear ratios for forward and reverse driving can be produced, with a differential transmission unit 4 and two vehicle axles 5, 6, such that in the present case the vehicle axle 5 which is the drive output of the vehicle drivetrain 1 is the rear axle of the vehicle and the vehicle axle 6 is its front axle.

The transmission device 3 can be any automated transmission known from practice, such as a dual-clutch transmission, an automatic torque converter, a semi-automatic manual shift transmission or a continuously-variable transmission, so as to be able to produce the gear ratio required as a function of the operating status of the vehicle drivetrain 1 existing at the time.

In the example embodiment of the vehicle drivetrain 1 shown in FIG. 1, the engine 2 is an internal combustion engine, but can in an alternative design also be in the form of an electric motor or a hybrid drive. The differential transmission unit 4 is arranged between the transmission device 3 and the vehicle axle 5, which in a known manner is connected on each side of the vehicle with at least one drive wheel 7, 8.

Below, the method according to the invention is explained in more detail with reference to a transmission device 3 in the form of an automatic gearshift transmission, the transmission device 3 being able to produce five different gear steps with decreasing gear ratio values or transmission ratios. The method can be used just as well for infinitely-adjustable transmission systems.

The transmission device 3 can be operated both in an automatic shifting mode and in a manual shifting mode or a shifting mode equivalent thereto. During the automatic shifting mode, on the basis of a current driving condition, a gear step is determined automatically by an electronic transmission control system and engaged in the transmission device 3 by a hydraulic control unit coupled thereto.

In order to increase the drive torque of the engine 2 in the area of the drive output by virtue of the gear currently engaged in the transmission device 3 during the automatic shifting mode, for example in order to carry out a spontaneous overtaking process, or an applied thrust torque of the engine 2, for example while driving on a downhill slope, when there is a driver's command for a downshift the automatic shifting mode is first changed to the manual shifting mode.

A change from the automatic shifting mode to the manual shifting mode takes place, inter alia, when the driver moves a shift lever to a position that activates the manual shifting mode and then, within a specified short time period, actuates a so-termed tip-minus switch in order to command a change starting from the currently engaged gear in the direction of a lower gear with a higher gear ratio.

In addition or alternatively, a driver's shift command that triggers a change from the automatic to the other shift mode can be recognized when the driver, for example, actuates a tip-minus switch positioned in the area of a steering wheel, and a change preferably then takes place to a short-time manual mode equivalent to the manual shifting mode during which the driver, by means of a corresponding shift command, can change a gear ratio step selected in the preceding automatic shifting mode. From the short-time manual mode, after the lapse of a specified time interval the system automatically reverts back into the automatic shifting mode without any further shift command from the driver.

To enable, by virtue of entering the manual shifting mode and carrying out the associated downshift, a torque change in the area of the drive output of the vehicle's drivetrain 1, which is adapted to the current operating status of the transmission device 3, the target gear to be engaged in the transmission device 3 as the result of a driver's downshift command is determined as a function of the current transmission output speed of the transmission device 3, in the manner described below. If the transmission device 3 is already operating in the manual shifting mode, then when the driver activates a downshift command a single downshift starting from the gear step "1", "2", "3", "4" currently engaged in the transmission device 3 is carried out.

Depending on the application existing at the time, it is also possible for the target gear to be determined as a function of a rotational speed value equivalent to the transmission output speed, for example a rotational speed of the drive wheels 7, 8, which is in turn proportional to the speed of the vehicle.

To determine the target gear to be engaged in the transmission device 3 when the driver commands a downshift at the same time as a change from the automatic to the manual shifting mode, in this case a characteristic performance matrix shown in FIG. 2 and implemented in the electronic transmission control system is used. Concrete transmission output speeds, stated in R/min (revolutions per minute) unit are associated with each of the first four gears "1", "2", "3", "4" of the transmission device 3 and represent gear-specific threshold values and which in each case vary as a function of an influencing parameter that characterizes a concrete vehicle condition. The fifth gear of the transmission device 3 has no transmission output speed associated with it since, being the highest gear, the fifth gear can never be selected as the target gear for a downshift.

In this case, the threshold values of the transmission output speed stored in the characteristic matrix and associated with the respective gear steps "1", "2", "3", "4" vary as a function of an influencing parameter or a gradient S on which the vehicle is driving, such that the matrix provides transmission output speed thresholds for gradients of 6%, 2%, −2% and −6%. By definition positive gradient values represent uphill driving whereas negative gradient values in each case define downhill driving.

In the present case, the respective transmission output speed threshold values associated with the gears "1", "2", "3", "4" for the gradient values 2% and −2% are identical but, depending on the application in each case, they may also be different from one another. Furthermore, for a constant gradient value the transmission output speed threshold values associated with the respective gear steps "1", "2", "3", "4" increase strictly monotonically from the first "1" to the fourth "4" gear. Moreover, the transmission output speed threshold values associated with the gear steps "1", "2", "3", "4" are lower for small uphill or downhill gradients than for quantitatively larger gradient values. Consequently, a change of the torque applied in the area of the drive output of the vehicle's drivetrain that results from a downshift triggered by the driver, is larger when the positive or negative gradient value is large, than when it is quantitatively smaller.

For the operating-condition-dependent determination of the target gear to be engaged in the transmission device 3 in response to a driver's shift command, in accordance with the vehicle's condition at the time, which in this case is characterized by the gradient S on which the vehicle is currently driving, that gear "1", "2", "3", "4" is chosen, whose associated transmission output speed threshold value is by the least difference larger than, or even equal to the current transmission output speed existing when the shift command is made.

For example, if the driver commands a downshift when the fourth gear "4" is engaged in the transmission device 3 and when the current transmission output speed is 1180 R/min and the current gradient S is 6%, then in accordance with the characteristic performance matrix, the gear determined as the target gear to be engaged is the second gear step "2". This result stems from the fact that the threshold value associated in the matrix with the second gear "2" for a gradient S of 6% is 1200 R/min, and is therefore the threshold value that is higher than but closest to the actual transmission output speed of 1180 R/min.

Besides the gradient S taken into account by the characteristic performance matrix, other influencing parameters as well, which characterize a current operating condition of a vehicle, can also be involved in determining the transmission output speed threshold values associated with the respective gear steps, such as air resistance, the loading of the vehicle, an accelerator pedal position or gradient, and/or a longitudinal acceleration of the vehicle.

In addition, besides taking into account further influencing parameters in a single characteristic matrix, it is also possible to provide separate performance matrices, in each case corresponding to the matrix in FIG. 2, for different influencing parameters, such as a matrix that takes into account a driver's wish indication, in particular an accelerator pedal actuation. In such matrices the transmission output speed threshold values associated with the gears "1", "2", "3", "4" vary as a function of the influencing parameters concerned in the manner described earlier.

Alternatively or in addition, the possibility exists of implementing a functional routine that depends on the current operating status of the vehicle, or one that depends on at least one further influencing parameter, by virtue of the characteristic performance matrix either before or after the target gear "1", "2", "3", "4" is determined. By means of such a functional routine it can for example be determined that a target gear "1", "2", "3", "4" determined in accordance with the matrix in FIG. 2 is only selected and engaged in the transmission device 3 when an accelerator pedal actuation or an accelerator pedal gradient is smaller than a defined limit value or smaller than a defined threshold. To determine the target gear "1", "2", "3", "4" the additional boundary conditions set by the functional routines can be linked with one another in the electronic transmission control system by means of so-termed AND-links.

If a target gear "1", "2", "3", "4" determined in accordance with the matrix on the basis of a driver's shift command is the same as the gear "1", "2", "3", "4" currently engaged in the transmission 3, or if the target gear "1", "2", "3", "4" is higher than the currently engaged gear "1", "2", "3", "4", no shift is carried out starting from the gear "1", "2", "3", "4" currently engaged in the transmission toward the selected target gear. To fulfill the driver's wish indicated by the downshift command for a traction force or thrust torque increase, in such a case a single downshift starting from the gear "1", "2", "3", "4" currently engaged in the transmission 3 is commanded. However, the respective target gear "1", "2", "3", "4" so selected is only engaged in the transmission 3 provided that a maximum permitted transmission output speed that corresponds to the target gear "1", "2", "3", "4" selected, will not be exceeded by engaging the target gear "1", "2", "3", "4". This shift-prevention function is designed to avoid in a simple manner loads that might compromise the functions of the transmission 3 and the engine 2.

When the driver has commanded a shift and the gear engaged in the transmission 3 is the third gear "3", and also the current transmission output speed is 1330 R/min and the vehicle is driving up a 6% gradient, the target gear determined from the matrix is the third gear "3" since on a 6% gradient the threshold value associated with the third gear "3" is 1700 R/min and is therefore the next-higher value in relation to the current transmission output speed of 1330 R/min.

Since the third gear "3" selected as the target gear is the same as the gear already engaged in the transmission 3, a single downshift to the second gear "2" is commanded in order to meet the driver's wish for a larger traction force.

If a current value of an influencing parameter is determined, in this case a value of the gradient S, which is not explicitly stored in the matrix and which lies between values of the influencing parameter entered in the matrix, the threshold values of the transmission output speed to be assigned respectively to the gears "1", "2", "3", "4" as a function of the current value of the influencing parameter are determined by interpolation. For this, in each case those threshold values associated with gear steps in the matrix are used, which are explicitly entered in the matrix for respective values of the influencing parameter which are stored in the matrix and are adjacent to the currently determined value of the influencing parameter.

The respective, gear-ratio-specific transmission output speed threshold values determined by interpolation are, as described earlier, compared with the transmission output speed and in each case that gear is selected as the target gear, whose temporary threshold is just larger than or at least equal to the current transmission output speed. This ensures that a target gear adapted to the current value of the influencing parameter is selected without a need for unnecessarily large memory capacity in the area of the electrical transmission control system.

Advantageously, the method according to the invention is only carried out when changing from the automatic to the manual shifting mode, although it can also be provided that the procedure according to the invention can also be applied when the driver commands a downshift when the manual shifting mode of the transmission 3 has already been activated.

Basically, by means of the method according to the invention a predefined target gear is selected as a function of a current transmission output speed. With otherwise comparable boundary conditions and the same transmission output speed, by means of the method according to the invention, the same target gear is selected regardless of which gear step is currently engaged, so that the torque applied at the drive output after the downshift can in each case be anticipated by the driver.

The procedure according to the invention is particularly advantageous for transmission systems which can produce a large number of gear steps. This results from the fact that the interval between the individual gear steps is then small and single downshifts or operating-condition-independent multiple downshifts across more than one gear step sometimes do not produce the torque increase in the drive output area desired by the driver.

INDEXES

1 Vehicle drivetrain
2 Engine
3 Transmission device
4 Differential transmission device
5 Rear axle of the vehicle
6 Front axle of the vehicle
7 Drive wheel
8 Drive wheel
S Gradient
"1" First gear ratio step
"2" Second gear ratio step
"3" Third gear ratio step
"4" Fourth gear ratio step

The invention claimed is:

1. A method of operating a transmission device (3) with a plurality of gears ("1", "2", "3", "4"), the transmission device (3) being operable both in an automatic shifting mode, in which one of the plurality of gears ("1", "2", "3", "4") being selected automatically as a function of a current driving situation (S) of a vehicle, and a manual shifting mode, in which one of the plurality of gears ("1", "2", "3", "4") being selected as a function of a command from a driver, the method comprising the steps of:

changing operation of the transmission device (3), by a transmission control system, from the automatic shifting mode to the manual shifting mode when the driver commands a shift;

providing that a currently engaged gear is an actual gear ("1", "2", "3", "4") currently engaged in the transmission when the driver commands the shift;

associating, by the transmission control system, either a specific transmission output speed threshold value or a specific rotational speed threshold value equivalent thereto to each one of the plurality of gears ("1", "2", "3", "4");

selecting, via the transmission control system, a target gear ("1", "2", "3", "4") to engage in the transmission device (3) from the plurality of gears, when the driver commands a downshift, the target gear being selected based on either a current transmission output speed value or a current rotational speed value equivalent thereto, and the target gear ("1", "2", "3", "4") being the gear ("1", "2", "3", "4") having either the output speed threshold value or the rotational speed threshold value that is either higher than or equal to either the current transmission output speed value or the current rotational speed value equivalent thereto;

when the target gear ("1", "2", "3", "4") is determined, as a function of the driver's downshift command, to be higher than or equal to the currently engaged gear then overriding such determination and selecting a next lower gear from the currently engaged gear as the target gear;

when the target gear ("1", "2", "3", "4") is determined, as a function of the driver's downshift command, to be gear lower than the currently engaged gear then maintaining the lower gear as the target gear; and engaging the selected target gear via the transmission control system.

2. The method according to claim 1, further comprising a step of selecting the target gear ("1", "2", "3", "4") as a function of the command from the driver and as a function of at least one influencing parameter which comprises one of a current driving resistance, a driving surface gradient, an air resistance, an accelerator pedal position, an accelerator pedal gradient and a longitudinal acceleration of the vehicle.

3. The method according to claim 1, further comprising a step of storing the output speed threshold values and the rotational speed threshold values equivalent thereto associated with the gears ("1", "2", "3", "4") in a characteristic performance matrix.

4. The method according to claim 1, further comprising a step of carrying out interpolation between the output speed threshold values and the rotational speed threshold values equivalent thereto associated with an influencing parameter between which a current value of the influencing parameter lies, when there is an operating condition of the transmission (3) which is characterized by at least one current value of the influencing parameter that lies between values of the influencing parameter stored in the performance matrix, in order to determine the output speed threshold values and the rotational speed threshold values equivalent thereto which are associated with the plurality of gears ("1", "2", "3", "4"), and when the driver commands a downshift, the target gear ("1", "2", "3", "4") is determined with reference to the interpolated gear-specific output speed threshold values and the rotational speed threshold values equivalent thereto.

5. The method according to claim 1, further comprising a step of engaging the target gear ("1", "2", "3", "4") called for in the transmission (3) provided that a transmission input speed that corresponds to the target gear ("1", "2", "3", "4") is either lower than or equal to a maximum permitted transmission input speed.

6. A method of operating a transmission having a plurality of gear ratios and a transmission control unit, the transmission is operable in automatic and manual shifting modes, when the transmission is operating in the automatic shifting mode, the transmission control unit automatically selects and engages an appropriate one of the plurality of gear ratios based on a current vehicle drive situation, when the transmission is operating in the manual shifting mode, the transmission control unit controls a shift from a current gear ratio to a target gear ratio as a function of a shift command issued by the driver, the method comprising the steps of:

changing, with the transmission control unit, operation of the transmission from the automatic shifting mode to the manual shifting mode when the driver issues a downshift command by actuating a switch;

assigning, with the transmission control unit, a specific transmission output rotational speed threshold value to each of the plurality of gear ratios and storing the plurality of gear ratios and their respectively assigned specific transmission output rotational speed threshold values as a performance matrix in the transmission control unit;

detecting a current transmission output rotational speed;

comparing, with the transmission control unit, the current transmission output rotational speed in the current gear ratio to the specific transmission output rotational speed threshold values of the gear ratios that are lower than the current gear ratio in the performance matrix;

detecting the specific transmission output rotational speed threshold value that is either higher than or equal to the current transmission output rotational speed and selecting the lower gear ratio, to which the detected specific transmission output rotational speed threshold value is assigned, as a target gear ratio;

selecting, as the target gear, a gear a plurality of gear steps lower than the currently engaged gear when, of the plurality of gears, the gear a plurality of gear steps lower than the currently engaged gear has either the output speed threshold value or the rotational speed threshold value that is either equal to or by a least difference greater than either the current transmission output speed value or the current rotational speed value equivalent thereto;

when the target gear ("1", "2", "3", "4") is determined, as a function of the driver's downshift command, to be higher than or equal to the currently engaged gear then overriding such determination and selecting a next lower gear from the currently engaged gear as the target gear; and controlling a shift, with the transmission control unit, from the current gear ratio to the target gear ratio.

\* \* \* \* \*